United States Patent [19]

Hardin

[11] Patent Number: 4,830,755
[45] Date of Patent: May 16, 1989

[54] PROCESS AND APPARATUS FOR PURIFYING OIL CONTAMINATED GROUND WATER

[75] Inventor: Bret J. Hardin, Huntington Beach, Calif.

[73] Assignee: Ancon Management Incorporated, Wilmington, Calif.

[21] Appl. No.: 163,269

[22] Filed: Mar. 2, 1988

[51] Int. Cl.$^4$ .................................. B01D 17/02
[52] U.S. Cl. .................................. 210/662; 166/265; 210/669; 210/693; 210/694; 210/739; 210/747; 210/806; 210/85; 210/96.1; 210/170; 210/241; 210/258; 210/265
[58] Field of Search .................. 166/75.1, 265–267; 210/85, 96.1, 170, 241, 258, 259, 662, 669, 673, 677, 678, 693, 694, 739, 747, 793, 806, 265

[56] References Cited

U.S. PATENT DOCUMENTS

| | | | |
|---|---|---|---|
| 1,344,663 | 6/1920 | Waldrep | 210/85 X |
| 2,125,722 | 8/1938 | Hawkins | 210/96.1 X |
| 2,953,204 | 9/1960 | Dascher et al. | 210/170 X |
| 3,066,732 | 12/1962 | McEver | 166/265 X |
| 3,770,628 | 11/1973 | Yamamoto et al. | 210/669 |
| 4,031,007 | 6/1977 | Sierra, Jr. | 210/96.1 X |
| 4,105,553 | 8/1978 | Oldham | 210/806 X |
| 4,233,154 | 11/1980 | Presley | 166/267 X |
| 4,246,113 | 1/1981 | Mausgrover | 210/258 X |
| 4,252,649 | 2/1981 | Favret, Jr. | 210/170 X |
| 4,302,335 | 11/1981 | Habermas | 210/669 X |
| 4,315,822 | 2/1982 | Jaisinghani | 210/96.1 X |
| 4,366,063 | 12/1982 | O'Connor | 210/747 X |
| 4,374,028 | 2/1983 | Medina | 210/669 |
| 4,563,283 | 1/1986 | Nicksic | 210/739 X |
| 4,564,457 | 1/1986 | Cairo, Jr. et al. | 210/96.1 X |
| 4,572,786 | 2/1986 | Endo | 210/258 X |
| 4,592,844 | 6/1986 | Layman et al. | 210/739 X |
| 4,625,801 | 12/1986 | McLaughlin et al. | 166/267 |
| 4,681,682 | 7/1987 | White et al. | 210/241 X |
| 4,718,486 | 1/1988 | Black | 166/265 X |
| 4,761,225 | 8/1988 | Breslin | 166/265 X |

*Primary Examiner*—Robert Spitzer
*Attorney, Agent, or Firm*—Whann & Connors

[57] ABSTRACT

Oil contaminated ground water is purified by immersing one pump into the oil layer in the underground formation and another pump into the water layer in the underground formation and pumping the oil and water into, respectively, an oil storage tank and an oil/water separator. The water being pumped into the oil/water separator contains small amounts of emulsified oil which is separated from the water in the separator and forwarded to the oil storage tank. The water from the separator is passed through a series of filters to remove any trace amounts of oil present in the water so that the oil level in the purified water does not exceed 0.9 parts per billion.

20 Claims, 1 Drawing Sheet

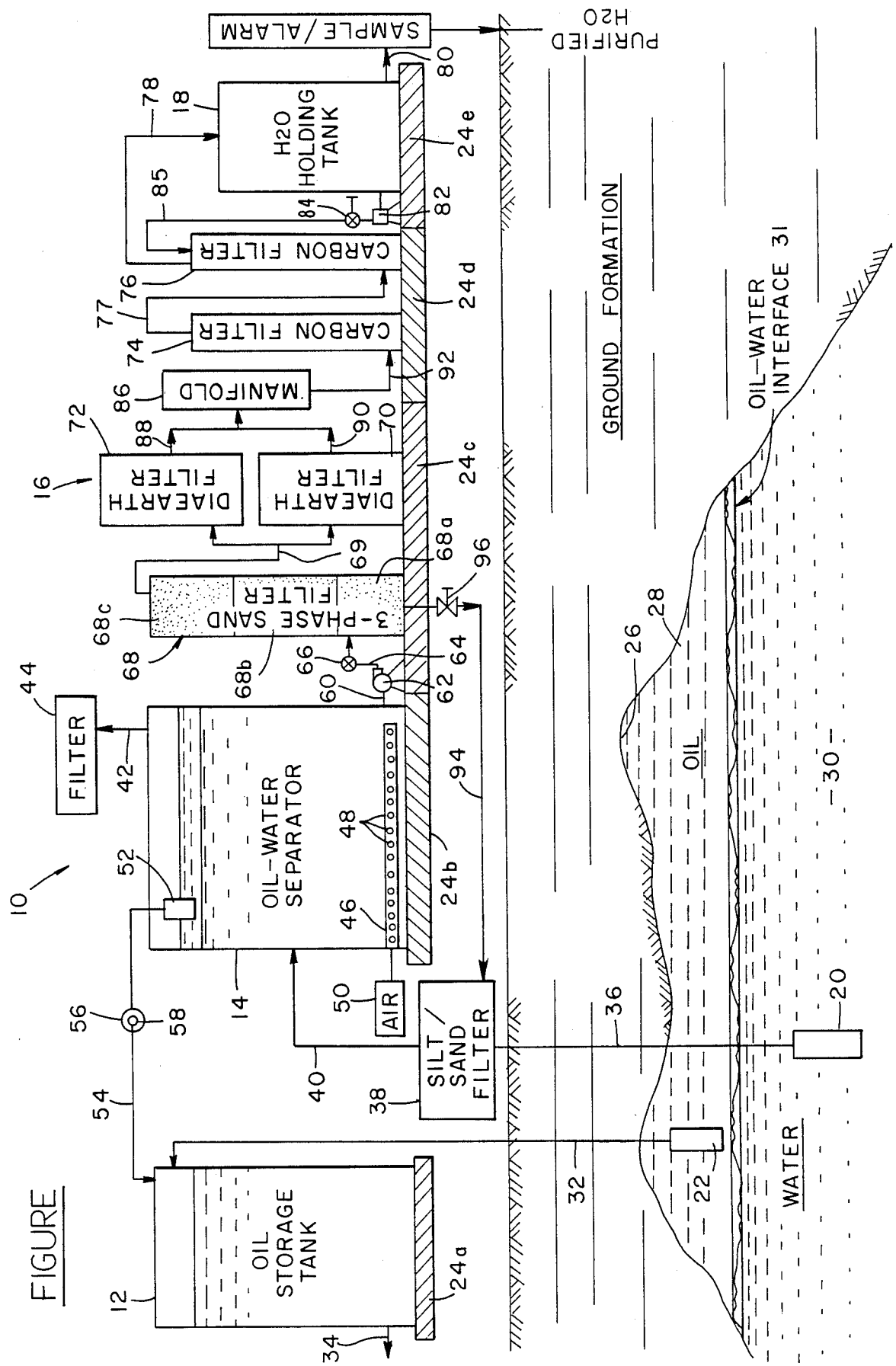

PROCESS AND APPARATUS FOR PURIFYING OIL CONTAMINATED GROUND WATER

BACKGROUND OF THE INVENTION

1. Field of the Invention

This invention relates to an apparatus and process for removing oil contamination from ground water.

2. Background Discussion

Ground water contamination by petroleum products, such as fuel oils and gasoline, has become an acute environmental problem (as used herein petroleum products shall be referred to as "oil"). Not only is such oil contaminated ground water difficult to detect, but it is also difficult to clean up once detected.

Typically, the oil leaks from a storage tank and flows into the ground until it reaches an underground formation which contains ground water. The oil collects as a separate layer floating on top of the ground water. This layer of oil will move from one underground formation to another with heavy rains. Usually, however, it collects within a dome-like cavity in the underground formation and remains there until a storm creates a rapid flow of water which flushes it from the cavity to another location. In some instances, the oil will remain in one general land area for years unless detected and removed. This oil contaminates the ground water which is often used for human consumption.

SUMMARY OF THE INVENTION

The present invention provides an inexpensive apparatus and process for collecting the oil contaminating ground water and purifying the ground water. It achieves this with the minimum amount of human supervision and it is portable so that it may be moved from one location to another where the oil contamination problem exists. There are several features of this invention which contribute to its efficatiousness, no single one of which is solely responsible for its desirable attributes. Without limiting the scope of this invention as expressed by the claims, its more prominent features will now be discussed briefly. After considering this discussion, and particularly after reading the section of this application entitled Detailed Description of the Preferred Embodiment, one will understand how the features of this invention provide its desirable attributes.

The first feature of this invention is the use of an oil pump and a water pump. The oil pump is disposed in the formation and immersed in the oil layer and pumps the oil into an oil storage tank. The water pump is disposed in the formation and immersed in the water layer and pumps water to an oil/water separator. There will be some emulsified oil present in the water even though it exists as a separate layer. This emulsified oil is separated from the bulk of the water and forms a layer on top of the water in the oil/water separator. The water in the oil/water separator is pumped through a filter system to remove any trace amounts of oil from the water and then the water is either returned to the ground or passed into a water distribution system for use by humans.

The second feature of this invention is the use of a skimmer pump located in the oil/water separator which periodically operates to skim oil from the surface of the water in the oil/water separator and pump it into the oil storage tank. Thus, the bulk of the oil in the formation is separated from the water and collected separately. Since this oil will ordinarily have value, collecting it is important so that it can be sold or used.

The third feature of this invention is the use of a monitor, such as a conventional chromagraphic analyzer, to detect and measure the amount of oil present in the effluent stream from the filter system. If the monitor detects that the level of oil in the water in this effluent stream is greater than about 0.9 parts per billion (ppb), a control signal is provided. This signal is used to turn on an alarm which would give an audio signal or to shut off the water pump to discontinue the pumping operation.

The fourth feature of this invention is the use of a filter system which employs several different types of filters to ensure that the water leaving the oil/water separator is essentially free of hydrocarbons. Preferably three types of filters are employed: a sand filter, a diatomaceous earth filter, and a carbon filter. The water from the oil/water separator flows first through the sand filter, then the diatomaceous earth filter, then through the carbon filter.

BRIEF DESCRIPTION OF THE DRAWING

The drawing, which is for illustrative purposes only, depicts the preferred embodiment of this invention and includes a FIGURE which is a schematic illustration of the apparatus and process of this invention.

DESCRIPTION OF THE PREFERRED EMBODIMENT

As shown in the FIGURE Apparatus, the apparatus 10 of this invention includes an oils storage tank 12, an oil/water separator 14, a filter system 16, a holding tank 18, a water pump 20, and an oil pump 22. The oil storage tank 12, oil/water separator 14, filter system 16, and holding tank 18 are all mounted, respectively, on skids 24a–24e so that they may be easily transported by truck to any location where oil has contaminated ground water.

The oil contaminated ground water is shown below the surface of the ground in a cavity 26 within the ground formation. The oil and water are present as two distinct layers 28 and 30, respectively, with an emulsified oil/water interface separating the two layers. There are, however, trace amounts of emulsified oil in the water layer which are unacceptable.

The oil pump 22 is connected through line 32 to the top of the oil storage tank 12. This oil pump 22 is of a conventional design and includes a detector (not shown) which senses when water is drawn into the pump. (A suitable oil pump is sold by Power Pumps Corporation of California.) The pump 22 is located a distance sufficiently above the oil/water interface 31, so that water is not ordinarily drawn into the oil pump. If this occurs nevertheless, the oil pump 22 will automatically turn off so that water is not pumped from the formation into the oil storage tank 12. The oil storage tank 12 has an outlet 34 near its bottom to permit the oil to be drained from the tank upon transportation to suitable storage location.

The water pump 20 is immersed in the water layer 30 and it is connected through line 36 to a silt and sand filter 38. Line 40 connects the silt and sand filter 38 to the oil/water separator 14. The pump 20 operates continuously to pump water into the oil/water separator 14. To prevent the interface 31 from dropping, water is returned to the formation. This is not required, however, if an underground stream is continuously feeding water into the formation.

The oil/water separator 14 is simply a large container for holding the water being pumped into it from the formation and it has a vent 42 at the top which is connected to a filter 44 that removes any hydrocarbon vapors from the gas exiting the separator. At the bottom of the oil/water separator is a hollow tube 46 having a plurality of orifices 48 therein. The tube 46 is connected to a source 50 of pressurized air which is forced into the tube to create tiny air bubbles which percolate upwardly through the water to the top of the oil/water separator 14. This percolation of air through the water strips the water of oil, with the gaseous hydrocarbons exiting through the vent and the liquid hydrocarbons collecting as a layer on the surface of the water in the oil/water separator 14. A skimmer pump 52 is floating on the surface of the water in the oil/water separator 14 and it is periodically actuated to skim the oil from the surface of the water and pump it through line 54 into the oil storage tank 12. A suitable skimmer pump is sold by Power Pumps Corporation of California, which includes a float that turns on the pump when the oil layer in the oil/water separator 14 reaches a predetermined level, for example, 8 inches. A viewer 56 with a glass window 58 in it is located in this line 54 to permit an operator to inspect the oil flowing through the line. If he detected water instead of oil, this would indicate that the skimmer pump 52 is malfunctioning.

The outlet 60 of the oil/water separator 14 is connected to a pump 62 which pumps the water through the filter system 16 and on into the holding tank 18. The outlet 64 of the pump has a three way valve 66 which is ordinarily closed to permit the water to flow through the valve into the filter system.

The filter system 16 includes a three phase sand filter 68, a pair of diatomaceous earth filters 70 and 72, and a pair of carbon filters 74 and 76. Line 77 connects carbon filter 74 to carbon filter 76. The three phase sand filter 68 has three distinct layers 68a-68c of sand with the coursest or largest diameter of sand being at the bottom of the filter and the finest or smallest diameter of sand being at the top of the filter. The outlet of the sand filter 68 is connected through the line 69 to the inlets of the diatomaceous earth filters 70 and 72. The diatomaceous earth filters 70 and 72 are placed side by side (rather than one on top of the other as schematically depicted) on the skid 24c.

The holding tank 18 is an optional feature, and its inlet is connected to the outlet of the carbon filter 76 through line 78 and its outlet is connected through line 80 to a monitor 81 which includes a chromagraphic analyzer (not shown) to measure the amount of hydrocarbon present in the effluent water. This monitor 81 is attached to, for example, an audio alarm (not shown) which is actuated by an electronic signal provided by a control circuit upon detection of an unacceptable level of hydrocarbon in the effluent water.

The apparatus 10 includes a backflush system which has a pump 82 having its inlet connected to an outlet of the holding tank. The outlet of the pump 82 is connected through a valve 84 and line 85 to the top of the carbon filter 76. The backflush system also includes a manifold 86 which connects the two lines 88 and 90 connecting, respectively, the diatomaceous earth filters 72 and 70 to the carbon filter 74 through the line 92. At the bottom of the sand filter 68 is a line 94 including a normally closed valve 96 which connects to the silt and sand filter 38.

PROCESS

In accordance with the process of this invention, the oil pump 20 and water pump 22 are operated simultaneously and continuously to pump, respectively, oil and water from the formation. The oil flows through the line 32 into the oil storage tank 12 and the water flows through the line 36, silt and sand filter 38, and line 40 into the oil/water separator 14. Air is pumped into the tube 48 and percolates as tiny bubbles through the water in the oil/water separator 14 to strip the water of hydrocarbon. The gaseous hydrocarbons exit through vent 42 with the carbon filter 44 collecting the hydrocarbons so they are not vented into the atmosphere. The skimmer pump 52 is actuated, automatically, when the oil layer on top of the water in the separator reaches a predetermined level. The skimmer pump 52 pumps this oil through the line 54 into the oil storage tank 12.

With the water pump 20 and oil pump 22 operating, the pump 62 is turned on to withdraw water from the bottom of the separator and pump it through the line 64 into the bottom end of the three phase sand filter 68. The rate at which water is withdrawn from the oil/water separator 14 equals the rate at which water is being pumped into the separator. In other words, both the water pump 20 and pump 62 have the same rated capacity which will not exceed about one hundred gallons per minute (gpm). The reason for the limitation on the pump capacity is to maintain the size of the oil/water separator 14 sufficiently small so that the separator and other components of the apparatus can be mounted on skids and moved from place to place as required.

The water leaving the sand filter 68 flows through the line 69 into the diatomaceous earth filters 70 and 72 and exits these filters and flows through the lines 88 and 90 and the manifold 86 into the lower end of the first carbon filter 74. It then flows from the top of this filter 74 into the bottom of the second carbon filter 76 and through line 78 into the top of the holding tank 18.

The effluent water from the holding tank is monitored as discussed above. If the hydrocarbon level is excessive, pumps 20 and 62 are shut off. This can be done manually or automatically. Since it is desirable to minimize human monitoring of the operation of the apparatus and process of this invention, it is preferred that the pumps 20 and 62 be shut off automatically through a control circuit (not shown). However, to minimize cost, an audio alarm can be actuated which will provide a sufficiently loud noise so that an operator will come to the site and manually shut off pumps 20 and 62.

When it is desired to backflush the apparatus, valves 84 and 96 are opened, valve 66 is closed, pump 82 is turned on, and the pumps 20 and 62 are shut off. Water will now flow from the holding tank 18 through the line 85 into and through the carbon filter 76 and then through line 77 through the carbon filter 74 and then through line 92 through the manifold 86, and lines 88 and 90 into, respectively, diatomaceous earth filters 72 and 70. The backflush water then flows from the diatomaceous earth filters through the line 69 into the top of the three phase sand filter 68a, out the line 94 into the silt and sand filter 38 and back through line 36 and pump 20 into the water in the formation.

SUMMARY

In accordance with this invention, during normal operation, both the oil pump 22 and water pump 20 operate simultaneously. Oil contaminated water flowing into the oil/water separator 14 is stripped of hydrocarbons and then polished by the filter system 16 to remove trace quantities of oil so that the hydrocarbon level does not exceed 0.9 part per billion. As illustrated in the Figure, the purified water leaving the apparatus 10 is returned to the ground. This maintains the level of the interface essentially constant since the rate at which water is being pumped from the ground equals the rate at which it is being returned. When an underground stream is feeding into the formation, it is desirable to feed the purified water into a distribution system rather than returning it to the formation. In this case, the water pump 20 would pump water from the formation at a rate equal to the rate the stream feeds water into the cavity 26. This would maintain the interface 31 at a constant height.

SCOPE OF THE INVENTION

The above description presents the best mode contemplated for carrying out the present invention as depicted in the preferred embodiment disclosed. The combination of features illustrated in this invention provides a process which purifies ground water of oil with minimal manual supervision and allows the apparatus to be moved to any desired site where ground water is contaminated. This invention is susceptible to modifications and alternate constructions from the embodiment shown in the drawing and described above. Consequently, it is not the intention to limit it to the particular embodiment disclosed. On the contrary, the intention is to cover all modifications and alternate constructions falling within the scope of the invention as generally expressed by the following claims.

I claim:

1. In an underground formation containing ground water contaminated by oil, with the oil and water being present as essentially two distinct layers, the process of purifying the water comprising the steps of
   (a) pumping the oil from the underground formation into an oil storage tank,
   (b) pumping the water from the underground formation into an oil/water separator to separate emulsified oil dispersed in the water,
   (c) pumping oil from the oil/water separator into the oil storage tank, and
   (d) passing the water from the oil/water separator through filter means which removes trace amounts of oil from the water.

2. The process of claim 1 wherein the amount of oil in the water leaving the filter means does not exceed 0.9 parts per billion.

3. The process of claim 2 wherein the water leaving the filter means is returned to the underground formation.

4. The process of claim 1 wherein the oil and water are simultaneously and continuously pumped from the underground formation.

5. The process of claim 1 wherein the filter means includes a series of filter elements of different types.

6. The process of claim 5 wherein the different type filter elements are a sand filter, diatomaceous earth filter, and carbon filter.

7. In an underground formation containing ground water contaminated by oil, with the oil and water being present as essentially two distinct layers contacting at an oil/water interface, the process of purifying the water comprising the steps of
   (a) simultaneously and continuously pumping the oil from the underground formation into an oil storage tank and water from the underground formation into an oil/water separator to separate emulsified oil dispersed in the water,
   (b) maintaining the oil/water interface at an essentially constant height in the formation during step (a),
   (c) pumping oil from the oil/water separator into the oil storage tank,
   (d) passing the water from the oil/water separator through filter means which removes trace amounts of oil from the water, and
   (e) monitoring the hydrocarbon level in the water leaving the filter means and providing a signal if the hydrocarbon level exceeds 0.9 parts per billion.

8. The process of claim 7 wherein the water leaving the filter means is returned to the formation to maintain the oil/water interface at said constant height.

9. The process of claim 8 wherein oil in the oil/water separator is periodically removed upon said oil forming a separate layer of predetermined height on the top of the water in the oil/water separator.

10. The process of claim 9 wherein the filter means are periodically backflushed by passing backwash water through the filter means in a direction opposite the flow during purification of the water and passing the backwash water into the formation as it leaves the filter means.

11. An apparatus for collecting oil contaminant ground water in an underground formation and for purifying the water, said oil and water being present as essentially two distinct layers, including
   oil storage tank means,
   oil/water separator means,
   oil pump means located in the underground formation and immersed in the oil layer for pumping oil to the oil storage tank means,
   water pump means located in the underground formation and immersed in the water layer for pumping water to the oil/water separator means,
   means placing the oil pump means in communication with the oil storage tank means,
   means placing the water pump means in communication with the oil/water separator means,
   filter means which removes trace amounts of oil from the water,
   means for passing the water from the oil/water separator through the filter means, and
   means for transferring oil separated in the oil/water separator means to the oil storage tank means.

12. The apparatus of claim 11 wherein the maximum capacity of the water pump means is 100 gallons per minute.

13. The apparatus of claim 11 including means for operating the oil pump means and water pump means simultaneously and continuously.

14. The apparatus of claim 11 wherein the filter means includes a series of filter elements of different types which are interconnected to allow water to flow therethrough.

15. The apparatus of claim 14 wherein the first element which the water passes through upon leaving the oil/water separator means is a sand filter, the second filter element is a diatomaceous earth filter, and the third filter element is a carbon filter.

16. The apparatus of claim 11 wherein the filter means has means for periodically backflushing the filter means.

17. The apparatus of claim 11 including means for monitoring the amount of oil in the water as it leaves the filter means and provides a signal when the amount of oil exceeds a predetermined maximum level.

18. The apparatus of claim 11 wherein the oil storage tank means is carried by skid means that allows the tank means to be transported to a remote location.

19. The apparatus of claim 11 wherein the oil/water separator means and filter means are carried by skid means that allow the separator means and filter means to be transported to a remote location.

20. The apparatus of claim 11 including means for pumping separated oil in the oil/water separator means to the oil storage tank means.

* * * * *